United States Patent [19]

Figa et al.

[11] Patent Number: 4,924,496
[45] Date of Patent: May 8, 1990

[54] AUTOMATIC INCOMING TELEPHONE CALL ORIGINATING NUMBER AND PARTY DISPLAY SYSTEM

[75] Inventors: Romek Figa, Quincy, Mass.;
Jonathan H. Cohen, Bethel, Conn.;
Samuel G. Cohen, Pleasantville, N.Y.

[73] Assignee: Romek Figa d/b/a Abraham & Sons, Hanover, Mass.

[21] Appl. No.: 193,377

[22] Filed: May 12, 1988

[51] Int. Cl.⁵ .............................................. H04M 1/27
[52] U.S. Cl. .................... 379/142; 379/355; 379/131; 379/199
[58] Field of Search ............... 379/142, 354, 355, 356, 379/357, 131, 199, 200

[56] References Cited

U.S. PATENT DOCUMENTS

| | | | |
|---|---|---|---|
| 4,304,968 | 12/1981 | Klavsner | 379/142 X |
| 4,443,664 | 4/1984 | Gange | 379/142 |
| 4,582,956 | 4/1986 | Doughty | 379/142 X |
| 4,656,657 | 4/1987 | Hunsicker | 379/131 X |
| 4,776,005 | 10/1988 | Petriccione et al. | 379/142 |

FOREIGN PATENT DOCUMENTS 0059854 4/1985 Japan ................................. 379/142

OTHER PUBLICATIONS

"The Revolution in Digitech", *Newsweek*, Mar. 18, 1985 pp. 48,49.
"On the Line", *The Wall Street Journal*, Oct. 29, 1985.
Robbins, William, "New Service Proposes to Make Phones the Servants of Users", N.Y. Times, 6-3-84.

*Primary Examiner*—James L. Dwyer
*Attorney, Agent, or Firm*—Joseph S. Iandiorio

[57] ABSTRACT

An automatic incoming telephone call number display system for detecting an incoming call and identifying the party associated with the incoming call number. The system includes a directory of telephone numbers and parties associated with those numbers. Circuitry detects the origin telephone number of an incoming telephone call and compares that number with numbers in the directory for identifying the calling party. A display permits the user to view the incoming call number and party associated with that number.

32 Claims, 15 Drawing Sheets

```
MON JAN 17   12:22 AM
1 617 555 4502      i = 17
```

SHT. 1 OF 3

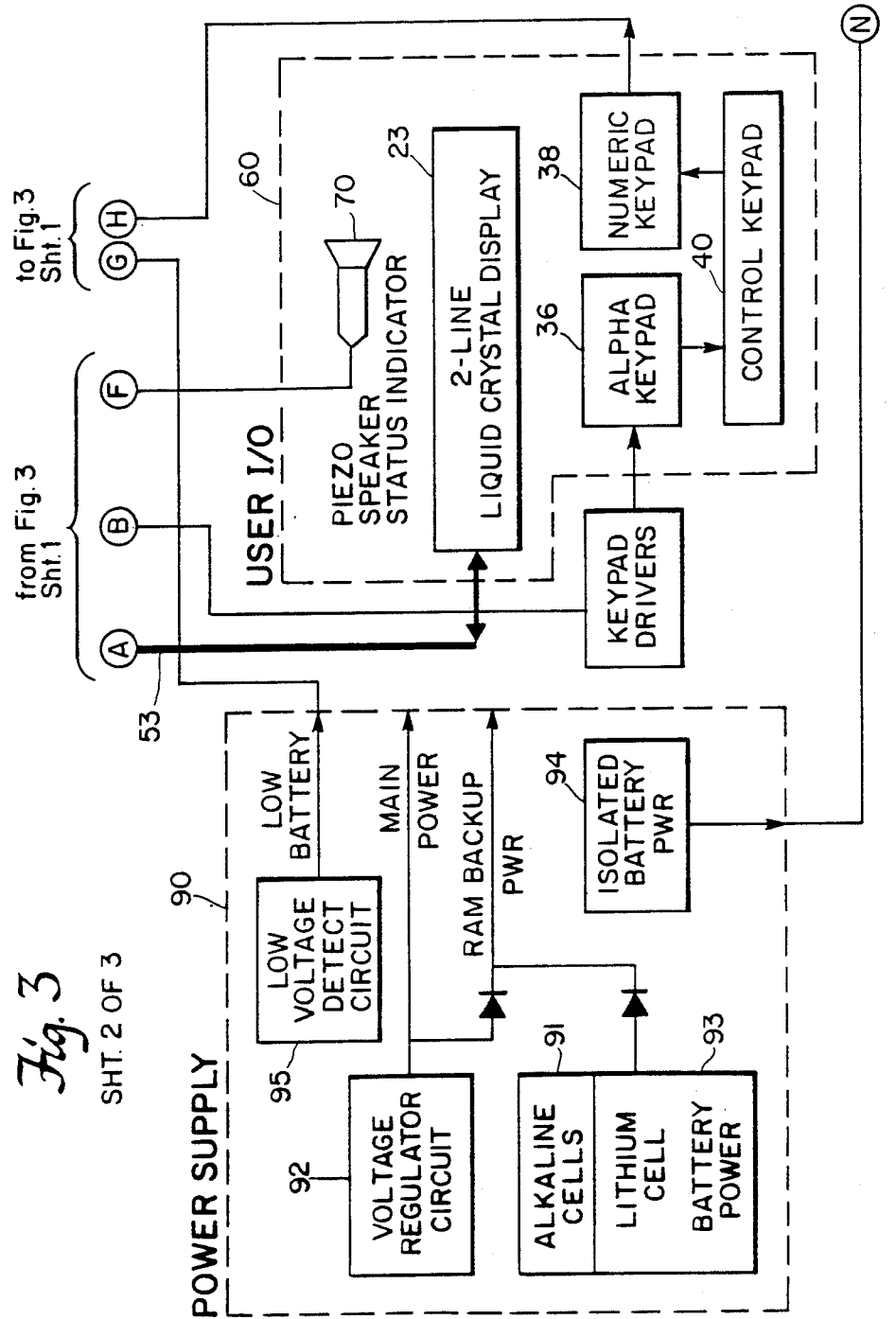

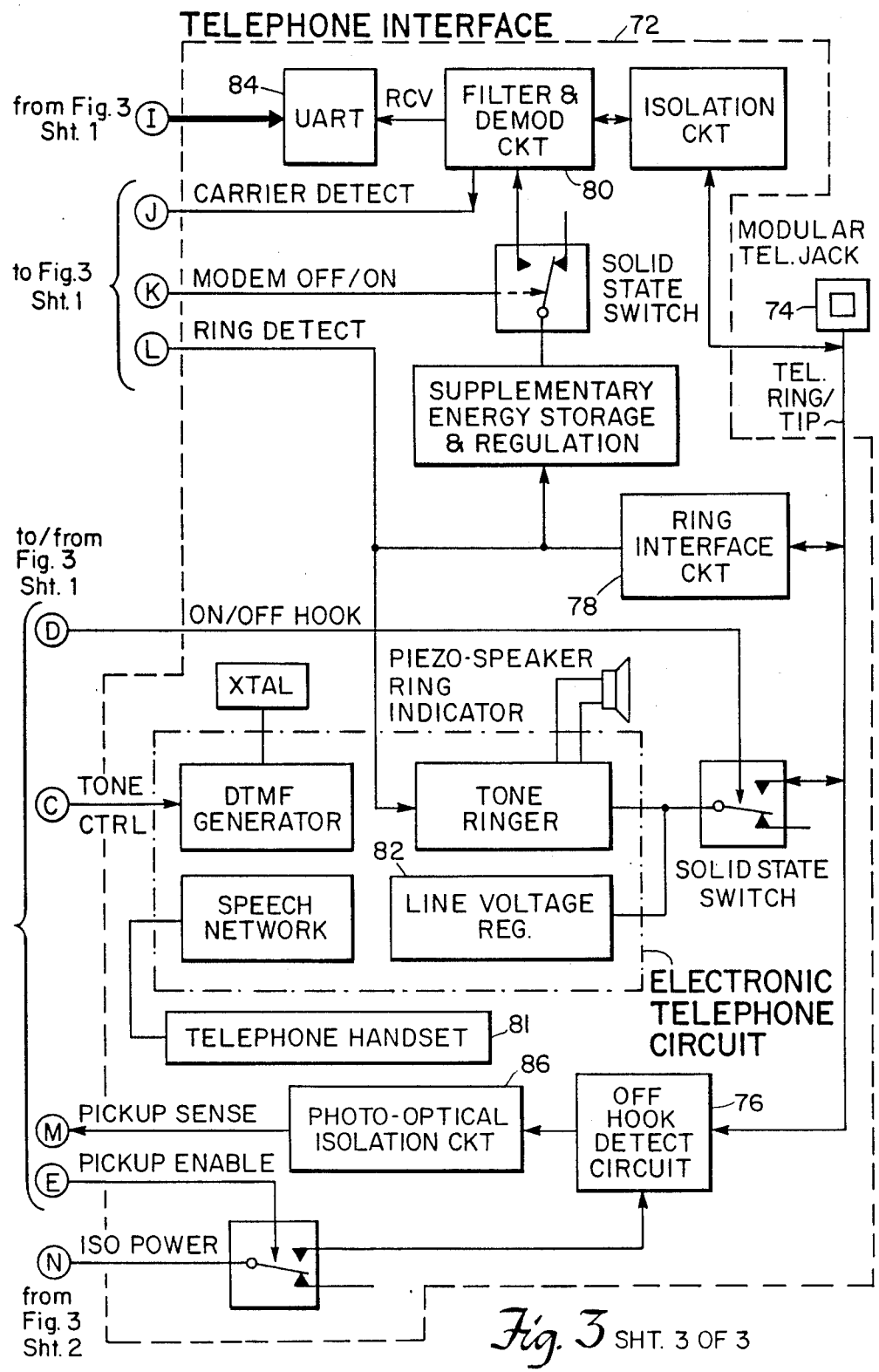
Fig. 3 SHT. 3 OF 3

AUTOMATIC INCOMING TELEPHONE CALL ORIGINATING NUMBER AND PARTY DISPLAY SYSTEM

FIELD OF INVENTION

This invention relates to an automatic telephone incoming call number display system and more particularly to such a system employing a directory for displaying the identity and telephone number of a calling party.

BACKGROUND OF INVENTION

A variety of devices are available for displaying the telephone number of a caller after a connection has been established between the parties for talking. One such device answers an incoming call by sending a message to the caller instructing that party to dial his own telephone number. That number is received by the device and compared with a directory of names and associated telephone numbers for logging that name and number for later display and review by the user. Such a device is disclosed in U.S. Pat. No. 4,304,968 which was issued Dec. 8, 1981 to Klausner et al. A disadvantage of these devices is that a caller must not only respond to the device's instruction, but will also be required to pay for the call, if it is a toll call.

Another device that is presently available is a telephone station set which gives customers the ability to view the telephone number of the calling party even while the phone is still ringing. The telephone station set takes advantage of a special service provided by the telephone company which sends the phone number of the caller during the silent interval between rings. Each number is decoded and displayed by equipment at the customer's premises. If a call is not answered the number is stored for later review. This special service may also include transmitting additional information such as personal messages and time of day, as well as other useful information. An example of this type of device is disclosed in U.S. Pat. No. 4,582,956, which was issued Apr. 15, 1986, to Carolyn A. Doughty. With such a device, however, the customer must depend on the telephone company for transmitting all desired information pertaining to that incoming call, including the name of the calling party.

SUMMARY OF INVENTION

It is therefore an object of this invention to provide an incoming telephone call number display system that detects the telephone number of an incoming caller, which is transmitted by the telephone company, and automatically displays that caller's telephone number and the party's name associated with that number as listed in the system's directory, before the call is answered.

It is a further object of this invention to provide such a directory that is defined by the user for identifying the party associated with the caller's number.

It is a further object of this invention to provide such a system for logging all incoming and outgoing calls.

It is a further object of this invention to provide such a system for automatically dialing numbers directly from the log of incoming and outgoing calls or from the directory.

It is a further object of this invention to provide such a system which permits a user to quickly search for a specific name and number in the log or directory.

It is a further object of this invention to provide such a system that logs incoming and outgoing calls chronologically.

It is a further object of this invention to provide such a system that stores time and date of all incoming and outgoing calls together with the caller's telephone number and the number dialed, respectively.

It is therefore an object of this invention to provide such a system that stores the duration of the call.

It is a further object of this invention to provide such a system that includes a phone ring and tip line which may be plugged into any standard telephone company modular jack.

It is a further object of this invention to provide such a system which displays current time and date when the device is not in use.

It is a further object of this invention to provide such a system which stores directory entries so that multiple entries can be easily retrieved and dialed in succession.

It is a further object of this invention to provide such a system which permits the directory to be examined and edited.

It is a further object of this invention to provide such a system for creating directory entries from the log of incoming or outgoing calls.

It is therefore an object of this invention to provide such a system that automatically detects the answering of an incoming call by any telephone extension.

It is therefore an object of this invention to provide such a system that permits directory entries to be added, edited or searched during a phone conversation.

The invention results from the realization that a truly effective automatic incoming telephone call number display system can be accomplished by detecting the telephone number of an incoming telephone call and automatically comparing that number with a directory of numbers defined by the user to identify the party associated with the incoming call number for displaying the incoming call number and the identified associated party before the incoming call is answered.

This invention features an automatic incoming telephone call number display system. The system includes a directory of telephone numbers and parties associated with those numbers, means for detecting the origin telephone number of an incoming telephone call, means for comparing the detected incoming telephone number with the directory of telephone numbers to identify the party associated with the incoming call number, and display means for displaying the incoming call number and the identified associated party. The system may include means for storing the detected number of the incoming call and means for recording the date and time of that call. The system may further include means for sensing when a telephone has gone off-hook in response to an incoming call, means for timing the duration of incoming call, and means for storing the duration of the incoming call. The date, time, and duration of the incoming call may be displayed on the display means. The system may also include means for storing the origin telephone number of the incoming call regardless of whether the telephone has gone off-hook in response to the incoming call.

The system may include means for switching the system to an off-hook condition when a number is dialed and means for timing the duration of the outgoing call. The date, time and duration of the outgoing call may be displayed on the display means. The date, time and duration of the outgoing call may also be stored. Means are further provided for searching the directory. Means for searching may include means for searching the directory by party or by number. A party and an associated number may be added to the directory or deleted from the directory. The system may also include means for editing the directory. A number stored in the system may then be automatically dialed. The system may also include means for logging incoming and outgoing calls in chronological order.

DISCLOSURE OF PREFERRED EMBODIMENTS

Other objects, features and advantages will occur from the following description of preferred embodiments and the accompanying drawings, in which.

Figure 1:
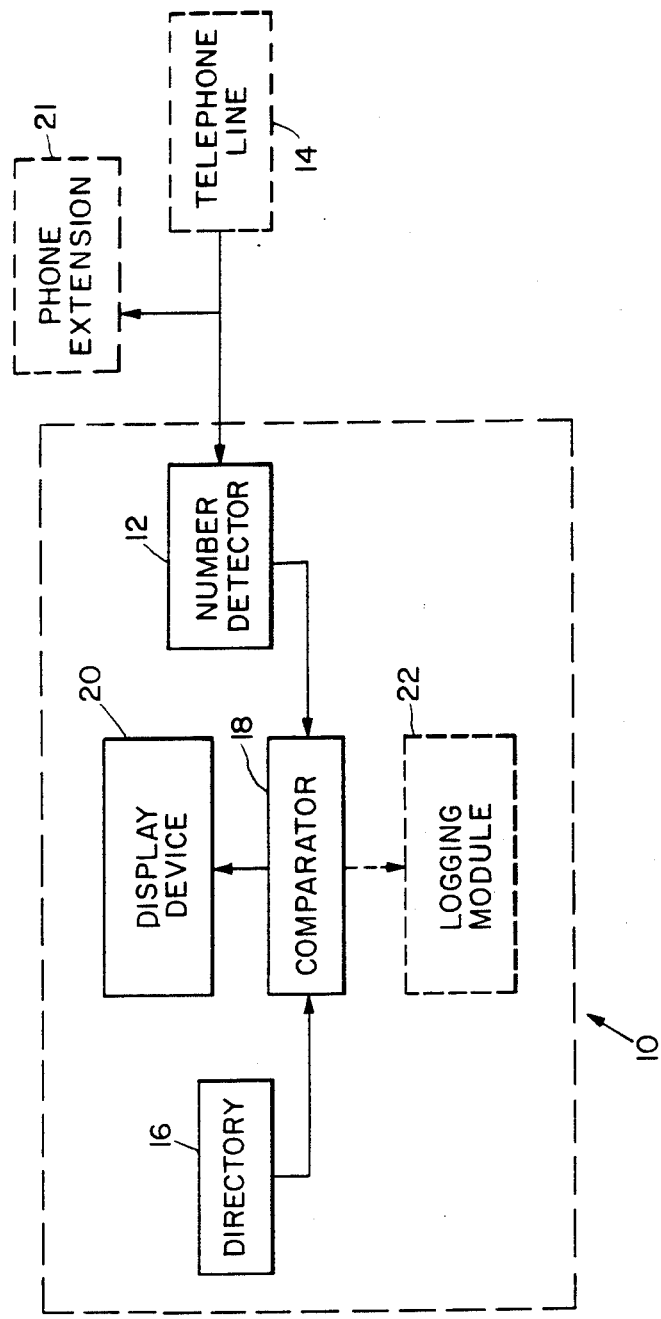
FIG. 1 is a block diagram illustrating an incoming telephone call number display system according to the present invention.

The present invention is accomplished by an incoming telephone number display system which utilizes a special service offered by the telephone company called Automatic Number Identification. The special feature of this service is that a caller's telephone number is transmitted by the telephone company to the customer during the silent period between rings. The incoming telephone number display system detects the caller's telephone number and compares that number with telephone numbers stored in a directory to identify and display the name and telephone number of the caller before the call is answered. The system also includes other special features such as logging incoming and outgoing telephone calls, their duration, and time and date of those calls. The system also has the ability to search, add to, delete from, or edit the directory during a telephone conversation. Other features are also provided and are discussed below.

Incoming telephone number display system 10 includes a number detector 12 which detects the telephone number of a caller from a telephone line 14. The number detected by number detector 12 is compared with telephone numbers stored in directory 16 by comparator 18. When the incoming number from a caller matches a number in directory 16, that number and the party associated with that telephone number is displayed on display device 20. In the preferred embodiment, system 10 also includes a logging module 22 for logging the number of incoming and outgoing calls. Logging module 22 may also store useful information such as the time, date, and duration of each call. Calls received on a phone extension 21 may also be detected by system 10 and logged by logging module 22.

Figure 2:
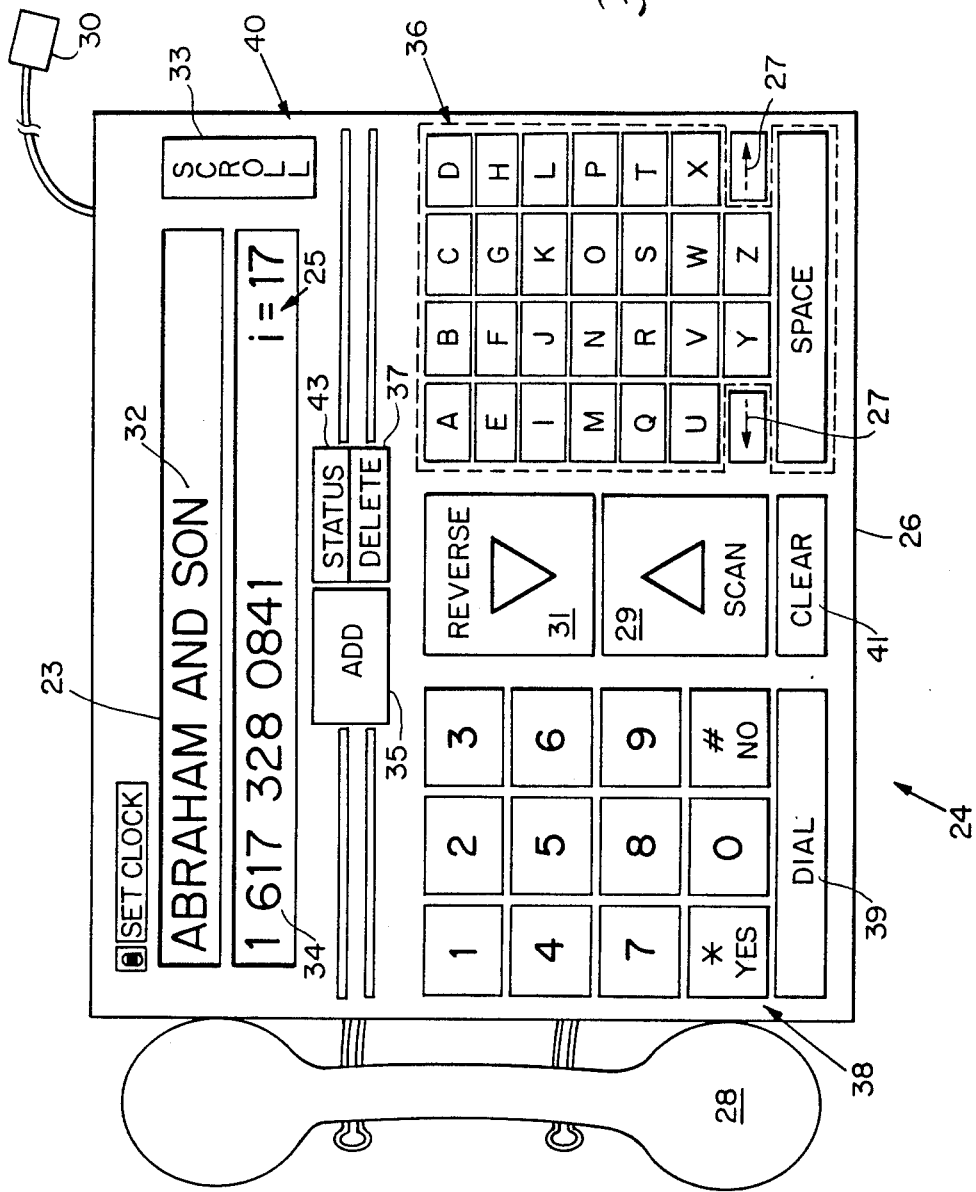
FIGS. 2 and 2a are the front view of a display panel of a control console for the incoming telephone call number display system of FIG. 1.
Figures 2A, 5:
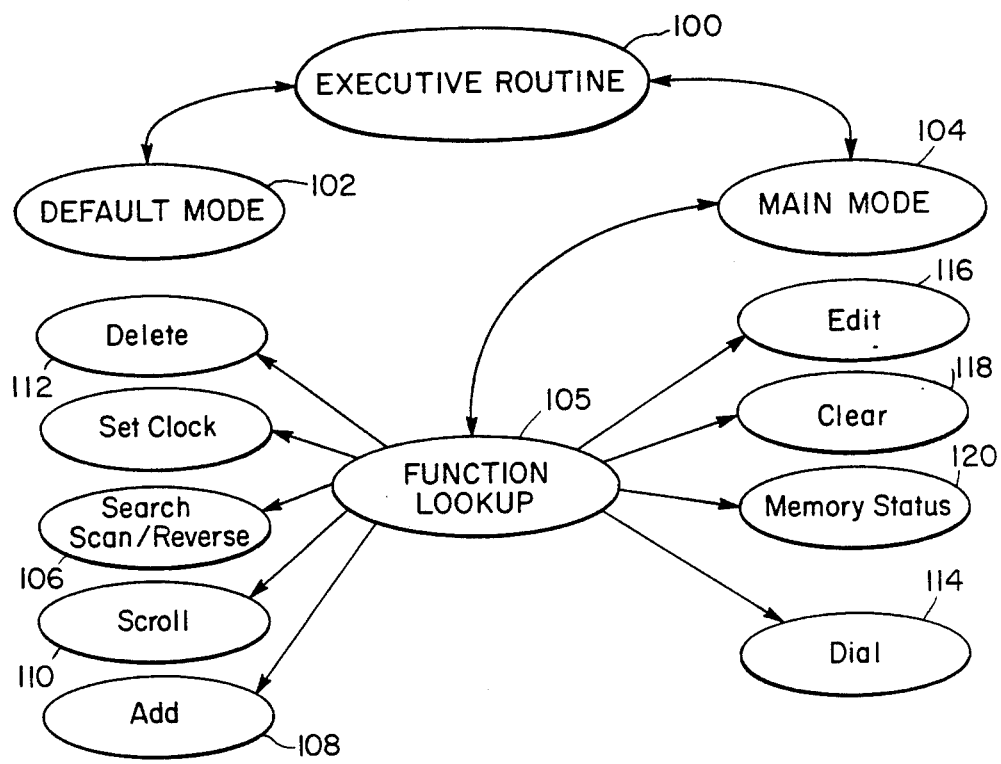
FIG. 5 is a diagram illustrating the software architecture of the system of FIG. 1.

System 10 is packaged to fit within a portable console 24 which includes a control panel 26 as shown in FIG. 2. Console 24 may be equipped with a hand receiver 28 and a ring and tip line 30, which may be plugged into any standard telephone company modular jack. Control panel 26 includes a liquid crystal display (LCD) 23, an alpha keypad 36, a numeric keypad 38, and a control keypad 40. Display 23 consists of a name line 32 and a number line 34 which are used in combination to display useful information about an incoming or outgoing phone call. For example, when system 10 receives an incoming call the name of the caller is displayed on name line 32 and the telephone number of the caller is displayed on number line 34, if the incoming caller's number matches a number stored in directory 16. If there is no match, the received number still appears on number line 34 but name line 32 will display " Call in progress ", indicating that there was no corresponding number found in the user's directory. Once the incoming call is answered, the time and date of the call are displayed on name line 32 and the amount of time elapsed during the call is displayed on number line 34 after a blinking equals sign 25, as shown in FIG. 2A, which indicates an active call. A non-blinking equals sign indicates that a stored log entry is displayed. Number line 34 is also used for indicating whether the call is an incoming or an outgoing call by displaying an "i" or an "o" symbol. It may also display a special character such as a minus sign (not shown) if the number was manually entered using numeric keypad 38 as opposed to being automatically received. This information is useful if the user wishes to edit the number and name of that party in the directory. Another special character such as a greater than sign, ">", can also be displayed for indicating that a number stored in logging module 22 matches a number stored in directory 16. Using this information, the user can then call up the matching number in the directory to identify the party.

Control keypad 40 consists of several function keys such as arrow indicators 27 for moving an edit cursor, not shown, on display 23. Other function keys include a scan key 29 and a reverse key 31 which are search keys used to search directory 16 or logging module 22, FIG. 1, for a general or particular name and/or number. Each entry that is located by the search is displayed on LCD 23. Scan key 29 initiates a search starting with the most recent entry stored in either the directory or the logging module and proceeds chronologically backward to the oldest entry stored each time that key is pressed. Reverse key 31 chronologically proceeds with the search in the opposite direction. Pressing scroll key 33, while searching the log, permits the user reviewing telephone numbers stored in logging module 22 on LCD 23 to display the identity of the party associated with that number if a matching number exists in the directory. Add and Delete keys 35 and 37, respectively, permit the user to add to or delete from the stored entries. Only the entry displayed is deleted. A dial key 39 allows the user to automatically dial the number displayed by LCD 23. If a name or number is improperly entered, a clear key 41 erases the entry shown by LCD 23 and allows the user to enter the proper name and numbers using alpha and numeric keypads 36 and 38. Pushing a status key 43 causes system 10 to display a number, not shown, which informs the user of the number of entries stored in logging module 22 or directory 16. It may also be used for displaying the capacity of logging module 22 or directory 16 to store more entries.

Figure 3:
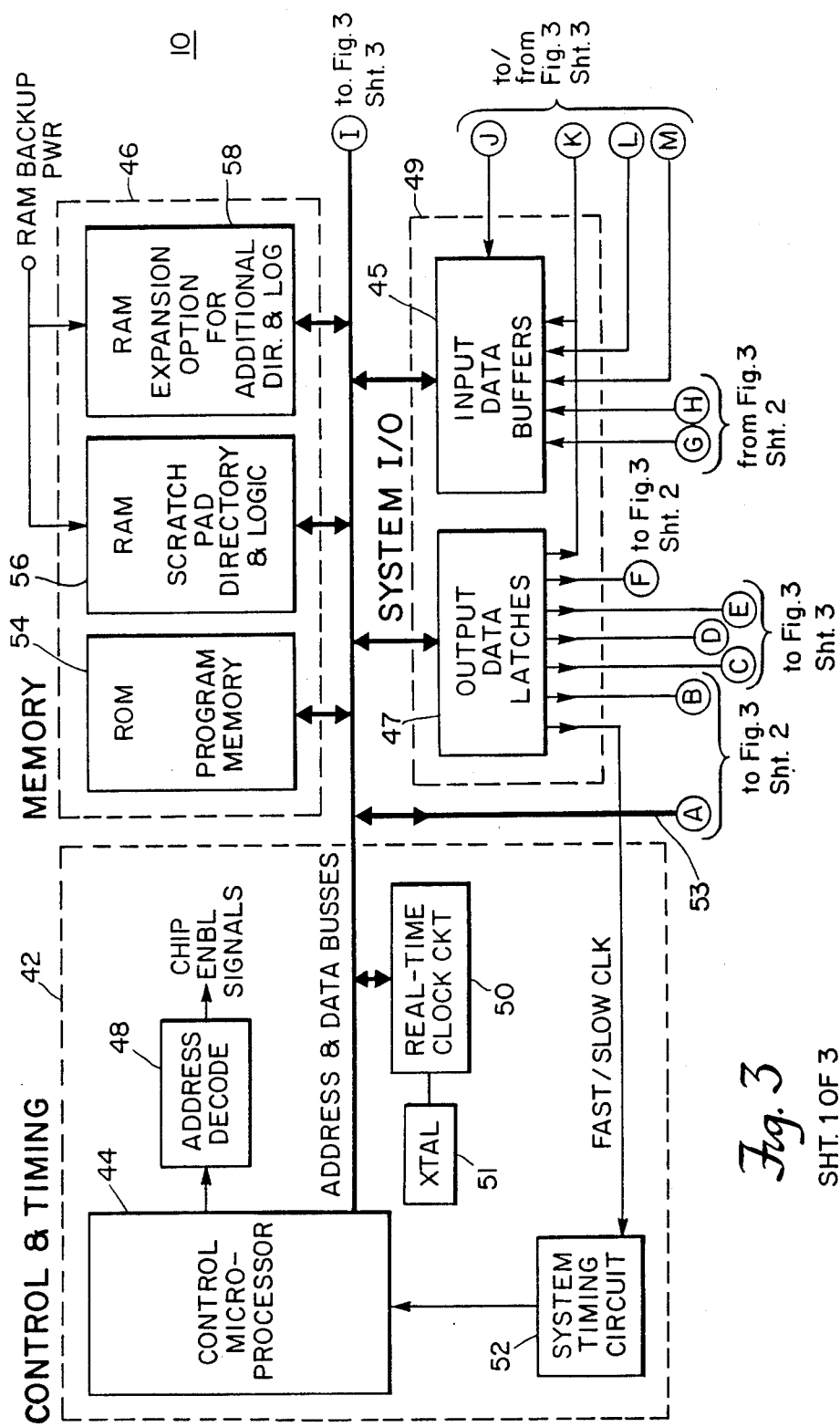
FIG. 3 is a detailed block diagram of the system shown in FIG. 1.

The electronic circuitry of system 10 is illustrated in the block diagram shown in FIG. 3 and includes control and timing circuit 42 and memory 46. Circuit 42 includes a microprocessor 44 which controls system 10 by executing instructions that are stored in memory 46. Memory 46 utilizes programmable read-only memory (PROM) 54 for storing program code and random access memory (RAM) 56 for storing log and directory data. In the preferred embodiment PROM 54 consists of 24K bytes of memory area and RAM 56 is an 8K static RAM. With this RAM capacity, it is possible to store approximately 40 directory entries (at 51 bytes each) and 80 log entries (at 26 bytes each). The amount of log and directory data that can be stored may be increased with the addition of an optional memory module 58.

In the preferred embodiment, microprocessor 44 is an 8-bit Z-80 microprocessor which utilizes an input/output (I/O) mapping of peripheral support components. Each I/O device is assigned a unique input or output port address and is selectively addressed by processor 44 using an address decode device 48. Data is transferred to that selected device via address and busses 5 and/or system I/O circuit 49, which consists of input data buffers 45 and output data latches 47.

Microprocessor 44 utilizes an externally generated interrupt routine for program housekeeping functions such as when display updates are made or when telephone interface circuit 72 monitors incoming or outgoing phone calls. System timers are decremented in this routine and are used as flags by other routines. Default and sleep counters, for example, are managed in this manner. Other timers such as minute timers for time of day and for elapsed time are also maintained.

Figure 4:
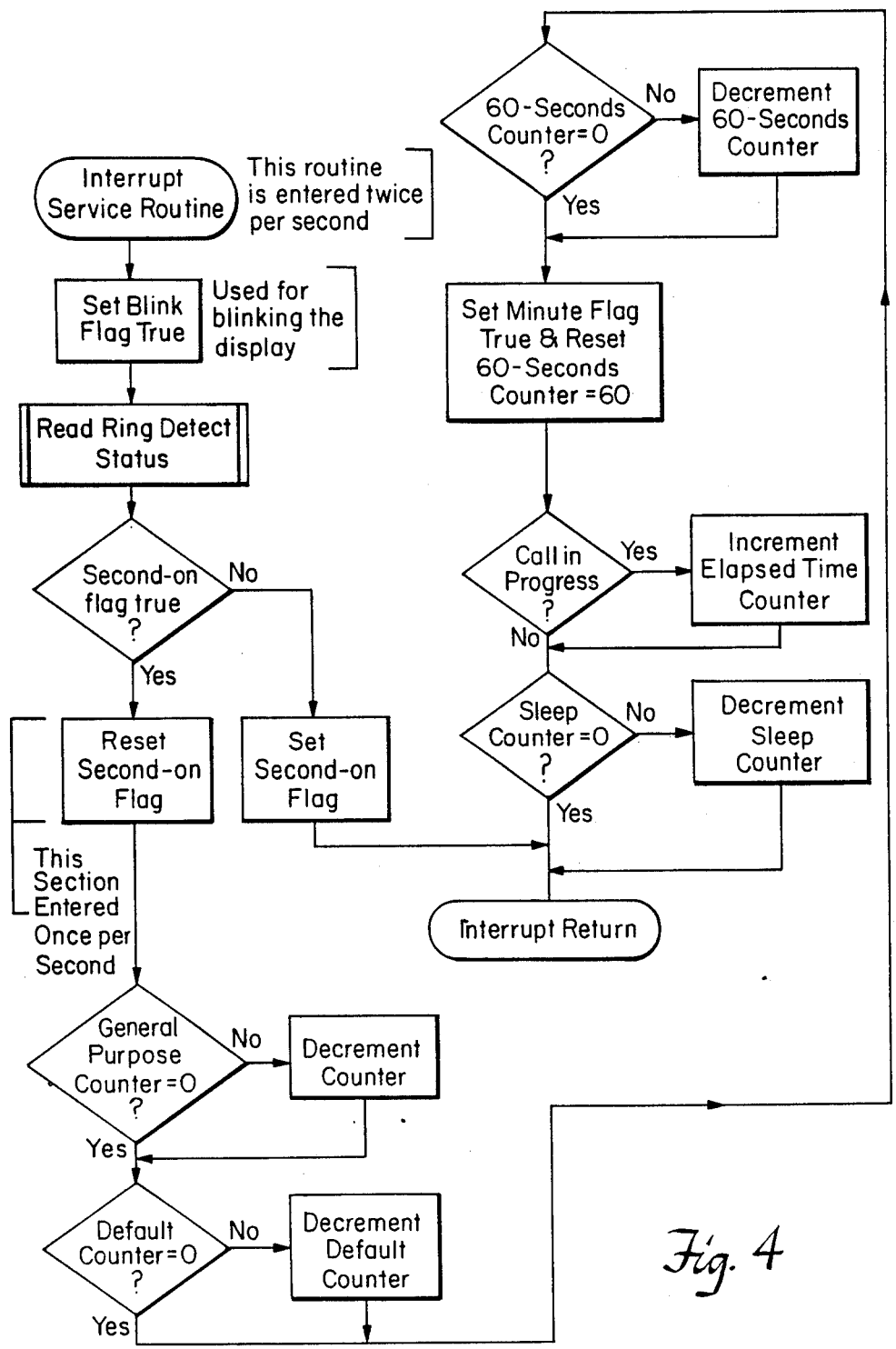
FIG. 4 is a flow chart of an interrupt service routine used in the system of FIG. 1.

This routine is entered two times per second. The timing signal that indicates this routine is generated in hardware by a real-time clock, discussed below. Interrupts are enabled and the time intervals of the interrupts, which are set up in the initialization routine, is selected under program control. When the interrupt signal occurs the routine temporarily suspends the present task, executes the interrupt service routine and then returns to the interrupted task. Since this routine is entered so frequently, in the preferred embodiment it is written in machine code in order to minimize the amount of time program tasks are suspended. Such an interrupt routine is shown as an example in FIG. 4.

Control and timing circuit 42 also includes a real-time clock circuit 50 and a system timing circuit 52. The real-time clock circuit employs a 32 KHz crystal 51 for providing the system with a current time and date. This clocking circuit also provides timing for interrupt control functions which are discussed above. System timing circuit 52 employs a dual speed clock from system I/O circuit 49 that is used for instruction cycle timing of microprocessor 44. The faster of the two clock rates, approximately 1 MHz, is used during normal operating conditions while the slower clock rate, approximately 250 KHz, is used during an inactive period which occurs after a period of inactivity, such as two minutes, for conserving energy.

Display updates are made by a user input/output (I/O) interface 60 which includes keypads 26, 36, 38 on control panel 26. Display data is transferred from microprocessor 44 to LCD 23 via an address and data bus 45. Display data may include log and directory entries, as well as prompt or error messages. A piezo speaker 70 is provided for audio feedback when keys are pressed or when errors occur.

A telephone interface circuit 72 includes circuitry which permits system 10 to be directly connected to a standard telephone modular jack 74. Telephone interface circuit 72 includes various control and monitoring circuits that are common to ordinary touch tone telephones. Circuits which are standard off-the-shelf items include an electronic telephone circuit 82 for controlling dialing functions and for interfacing a telephone handset 81 and a ring detect interface circuit 78 for detecting incoming calls. Telephone interface circuit 72 also includes a filter and demodulator circuit 80 that is used for demodulating a 300 baud rate of incoming serial data stream using the technique of Frequency Shift Keying. Data received by circuit 80 includes data representing the incoming telephone number which is received between the first and second ring. The actual protocol necessary for this circuit is described in U.S. Pat. No. 4,582,956 and is herewith incorporated by reference. Phase shift keying may be used for detecting higher baud rates. A universal asynchronous receiver/transmitter (UART) 84 is used for converting the serial data received from circuit 80 to a parallel format so that it can be read by microprocessor 44 via address and data bus 53. Circuits 80 and 84 are powered by the telephone line, not shown. Alternately, microprocessor 44 can perform the UART function. An On/Off Hook Detect Circuit 76 is used for detecting when the telephone handset 81 goes off-hook. A photo-optical isolation circuit 86 is used for electrically isolating system I/O circuit 49 from detect circuit 76.

System 10 currently operates from a battery-powered supply circuit 90, but may in the future provide an interface for an optional wall mount D.C. power supply to conserve battery power when portability is not required. Power supply circuit 90 utilizes four internal battery circuits. Power to control system 10, with the exception of telephone interface circuits 80 and 84, is driven from an alkaline cell battery circuit 91 which is regulated by a voltage control regulator 92. Off-hook detect circuit 76 of telephone interface circuit 72 requires a separate isolated battery circuit 94, since this circuit is connected across the telephone line. RAM 56 is powered by a lithium battery circuit 93 to retain data in the log and directory of RAM 56 when system 10 is turned off. Further, LCD 23 requires a 3-volt battery for a negative bias to provide user adjustment of the contrast ratio. Power supply circuit 90 also includes a low-voltage detect circuit 95 which is read by microprocessor 44 via system I/0 circuit 49 for generating a message on LCD 23 to inform the use of the present condition of the batteries. In the preferred embodiment, detect circuit 95 also inhibits changing the contents of RAM 56 when the power supply voltage is too low.

Software for the various functions of system 10 are coordinated by an executive routine 100 as illustrated by the software architecture shown in FIG. 5. Executive routine 100 operates in one of two modes, either a default mode 102 or a main mode 104. Executive routine 100 operates in a default mode 102 when the system is inactive or when no function requests are made by the user. When system 10 is inactive, default mode 102 displays the current time and date on name line 32. When a communication line is established for talking, default mode 102 displays the current date, time, phone number of the incoming or outgoing call, and elapsed time during the conversation.

Executive routine 100 operates in the main mode when function requests are made by the user. In the main mode, microprocessor 44, FIG. 3, waits for keys to be pressed for analyzing (105) which function is to be performed. Functions such as search 106, add 108, scroll 110, memory status 120, and delete 112 pertain to the data base and, as such, utilize the resident data base functions of searching, logging and memory management. Other functions such as dialing 114 and automatic call answering utilize the resident telephone functions of dialing, testing hook conditions, going on-hook and off-hook, and detecting carrier and ring signals. Editing functions are available for formulating names and numbers to be added or modified to the log or directory. Editing is also used for keying in search parameters. A clear function 118, while editing, will blank the display. Alternately, clear function 118 may be used to exit any function. Also available to any function are the low level, hardware dependent drive functions of the keypad, display and speaker. Once a function is performed, the executive routine returns to the default mode.

Figure 6:
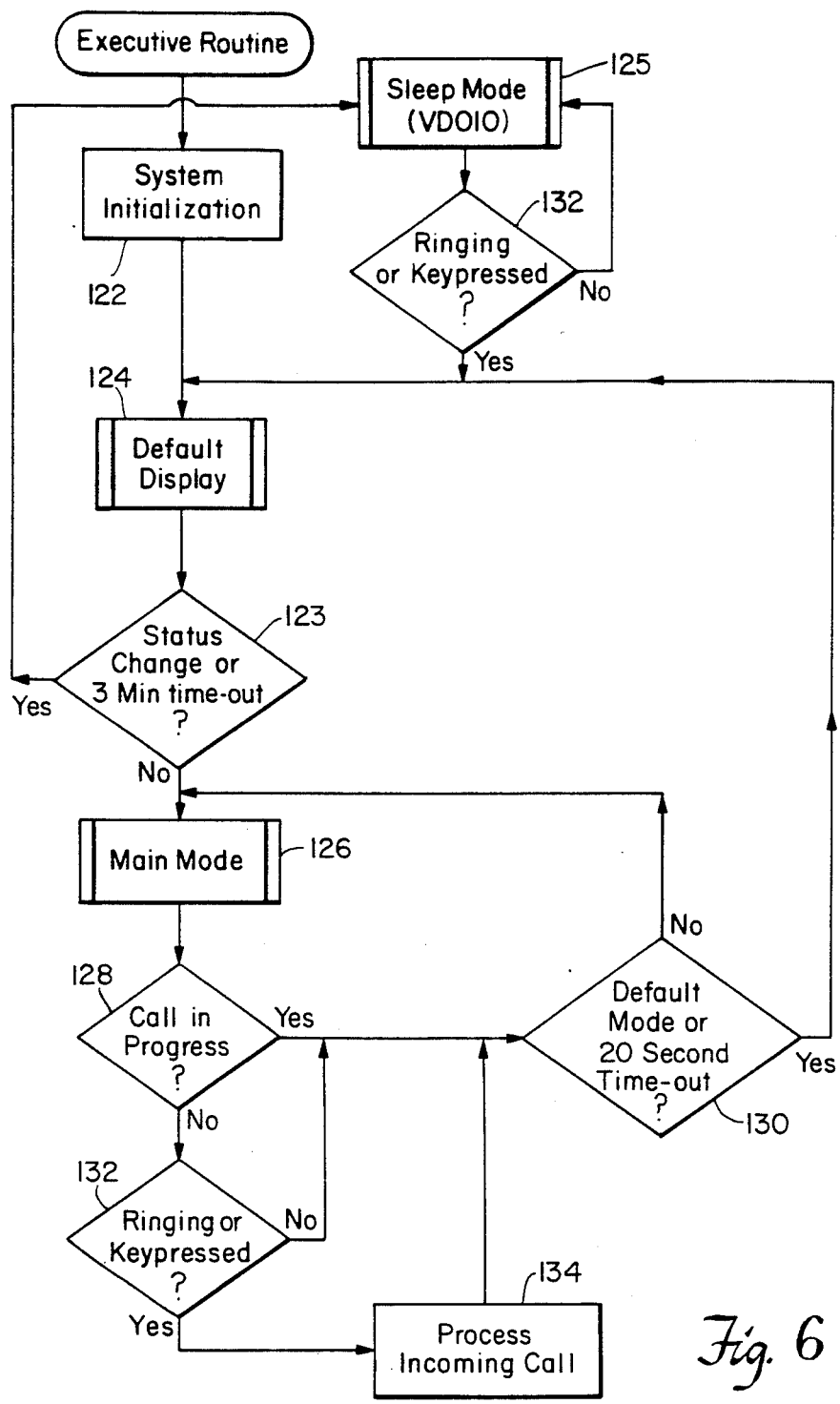
FIG. 6 is a flow chart of the executive routine shown in FIG. 5.

A flow chart for the executive routine is shown in FIG. 6. When the system is turned on, the executive routine initializes hardware devices and program variables, step 122. Once the system has been initialized, the executive routine enters the default mode, step 124, for displaying the current time and date on name line 32. The system remains in the default mode until either a key is pressed by a user, an incoming call is detected or a three-minute time-out has elapsed, step 123. If three minutes have passed without any phone activity system 10 enters a sleep mode, step 125. During the sleep mode, microprocessor 44 is operated by the slow clock. If a key is pressed or an incoming call is detected, the executive routine exits either the sleep mode or the default mode and enters the main mode, step 126. For example, when numeric keys, FIG. 2, are pressed on numeric keypad 38, the code read from keypad 38 is converted to an address through a look-up table stored in PROM 54 and the function at this address is then executed by displaying that number on LCD 23. The main mode, step 126, is then exited either through the completion of the operation such as dialing a telephone number or by a system time-out such as a 20-second time-out, steps 128 and 130. The system time-out informs microprocessor 44, FIG. 3, that no other key has been pressed during the last 20 seconds, which generally indicates that that function has been abandoned. The main mode is also exited when an incoming phone call is detected, steps 128 and 132. If system 10 senses the telephone go on-hook, the elapsed time of the call is stored and system 10 returns to the default mode which displays the current time and date on LCD 23, steps 130 and 124, respectively. When there is an incoming call, the executive routine processes the incoming call, step 134, and LCD 23 displays the name and number of the caller, step 134. The time and date as well as the duration of the call is then stored in the log.

Figure 7:
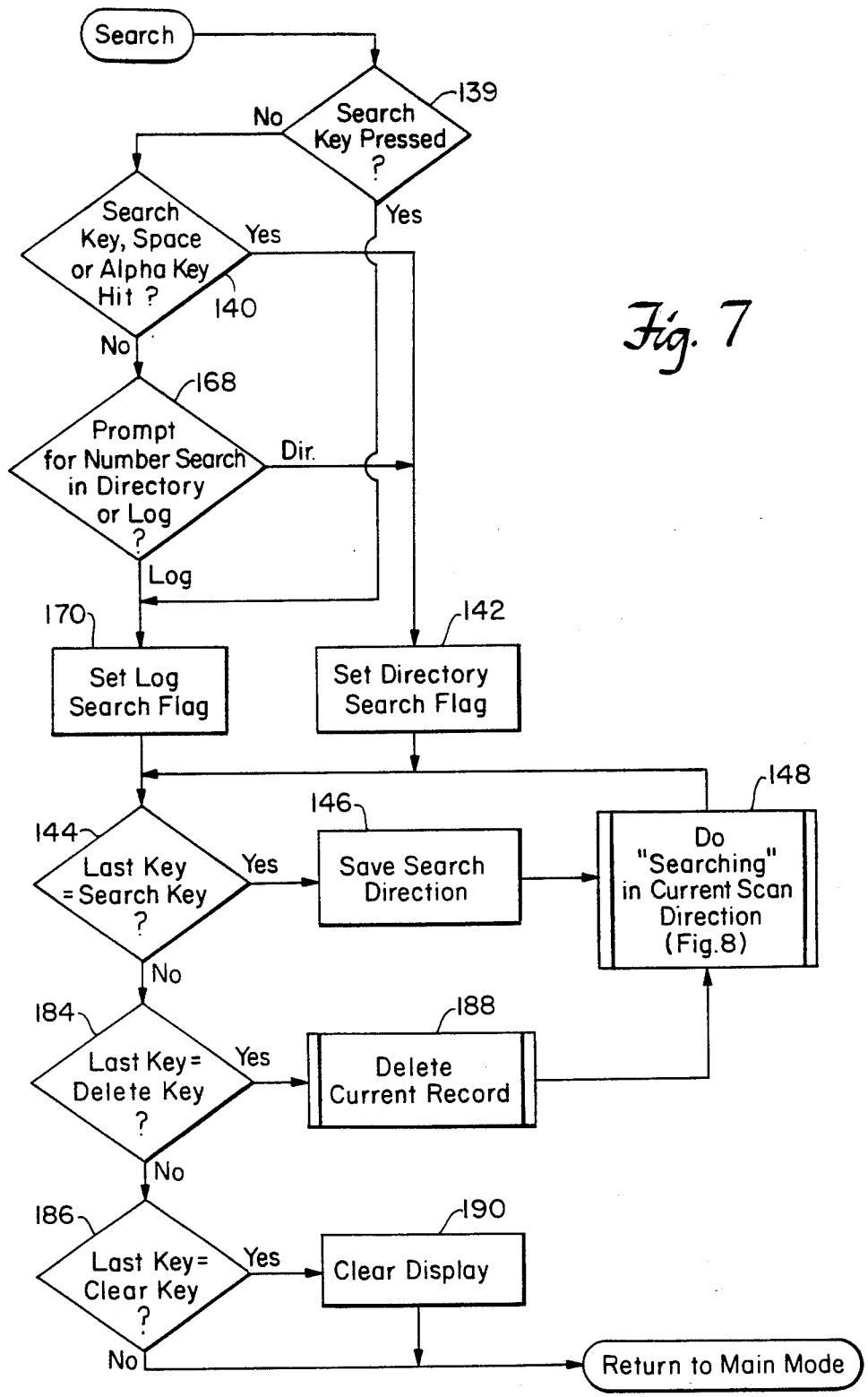
FIGS. 7 and 8 are flow charts of the search routine shown in FIG. 5.
Figure 8:
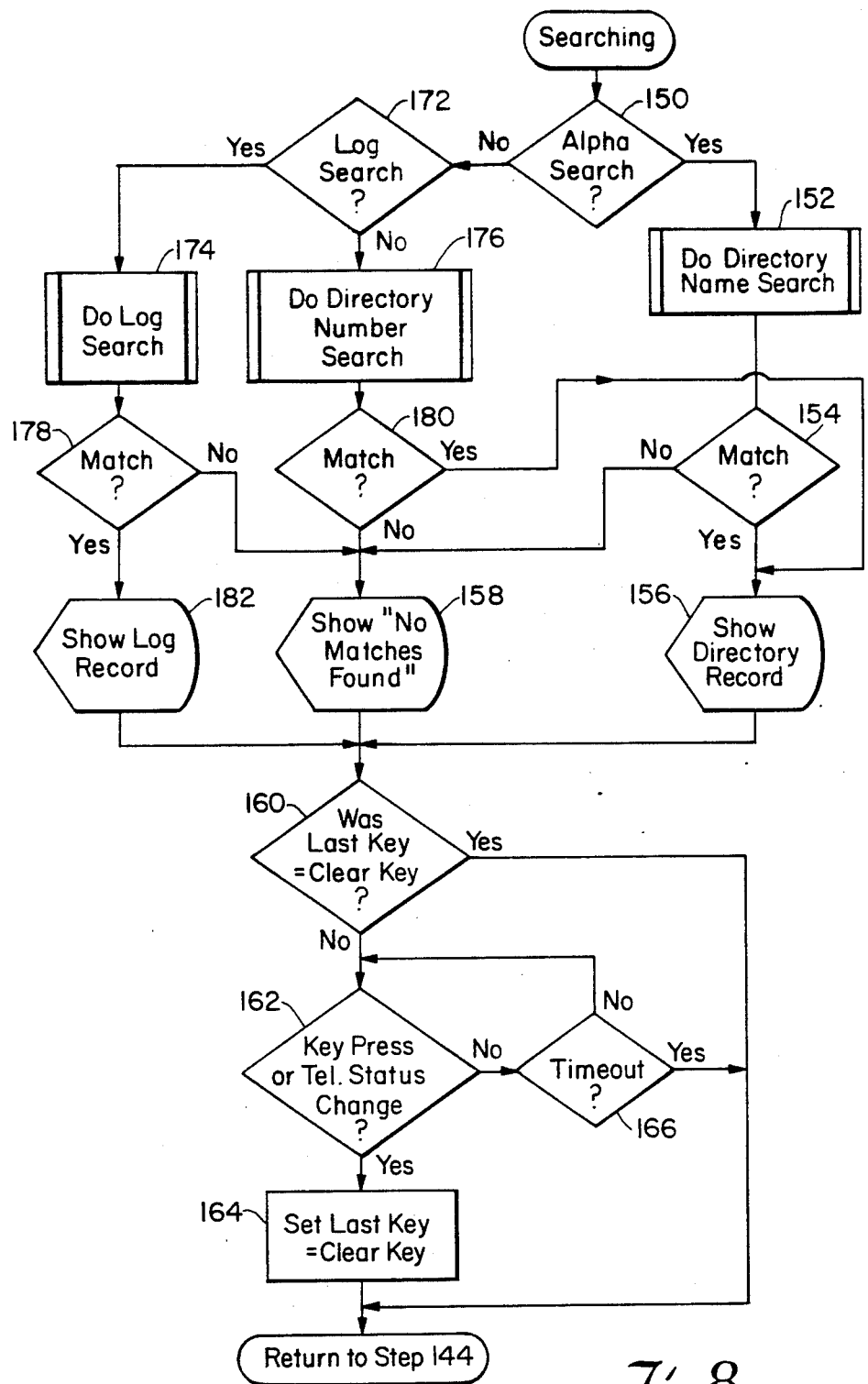

Main mode, step 126, is also the location in the executive routine where other functions such as a search are performed. A search function is used to locate a name or number in the directory or log of incoming or outgoing calls, as illustrated in the flow charts of FIGS. 7 and 8. A search in the directory is automatically initiated by entering one or more alpha characters or a space key and then pressing the scan or reverse function keys 29 and 30, FIG. 2, as illustrated by step 140. Selecting predetermined alpha characters limits the field of search to only names having that exact match of alpha characters. Failing to find an exact match, a search is conducted for names separated by spaces beginning with that sequence of alpha characters. Selecting a space key permits the user to perform a general search. A search for numbers can similarly be performed. After pressing the reverse or scan key a directory search flag is set, step 142. Software then determines whether the last key pressed was a scan function key 29 or a reverse function key 31, step 144. The search direction indicated by that key is then saved, step 146, and a search is conducted in the directory, steps 148, 150 and 152. As described above, pressing the scan function key 29, FIG. 2, causes the software to do a chronological search in the directory starting with the most recent name and telephone number stored in the directory. Pressing reverse function key 31, FIG. 2, causes the software to do a chronological search from the oldest name and telephone number in the directory to the most recent entry stored in memory. The alpha keys pressed for a preselected search are then compared to names in the directory for a match, step 152. If there was a match then the match is displayed on LCD 23, steps 154 and 156. If no match was found, a message is displayed on LCD 23 indicating that no matches were found, step 158.

After the initial search has been completed, a determination is made by the searching routine to determine whether the last key pressed was the clear key, step 160, for returning the program back to step 144, FIG. 7. If any other key was pressed, such as the dial key, or if the telephone status has changed, the last key pressed operates as a clear key for returning the software back to step 144, steps 162 and 164. After returning to step 144 an additional search can be conducted using the same alpha characters by pressing the search key again. Such searches are necessary if the alpha keys used to conduct the search represent an abbreviated form of several names stored in the directory. If, after a time interval of approximately sixty seconds, no key is pressed or the telephone status changed, then the software will automatically return to step 144.

When no additional searches are conducted, the software determines if the user has pressed the delete key or the clear key, steps 184 and 186. If the delete key was pressed, then the currently displayed record is deleted from the directory, step 188. The delete function is discussed in greater detail below. Pressing the clear key clears the display and returns the software back to the main mode, step 126, of the executive routine, step 190.

The software for the search routine also permits numbers to be searched in either the log or directory by pressing one or more numeric keys followed by a search key, step 168. A prompt is then displayed on LCD 23, FIG. 2, for allowing the user to select a search in the directory or the log of calls. If the user decides to perform a search in the directory, the D key on alpha keypad 36 is pressed for setting the directory search flag, steps 168 and 172. Pressing the L key and then a search key sets the log search flag, step 170. Since the last control key pressed was a search key, the direction of search indicated by that key is saved and the selected search is conducted, steps 148, 150, 172, 174 or 176. If a match is found, that match is displayed on LCD 23, steps 178 and 182 or steps 180 and 156. If no match is found, then a message indicating that no messages were found is displayed, step 158. Once the search has been completed, the search program returns to step 144 to determine if an additional search is to be conducted as described above. Pressing only a search key, 29 and 31, from a default display will permit the user to search the log directly in chronological order as described, step 139.

Figure 9:
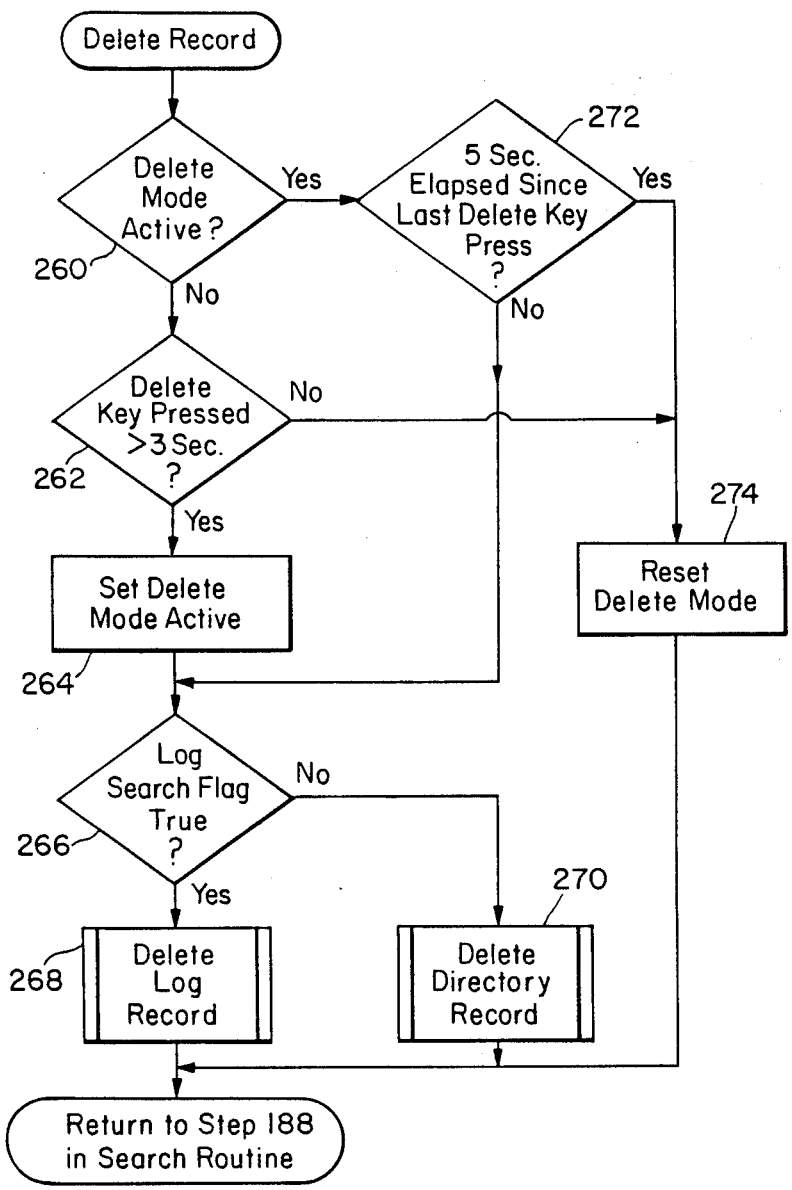
FIG. 9 is a flow chart for deleting records shown in FIG. 5.

The delete function is a subroutine that is performed during step 188 of the search routine and is initiated by pressing delete key 37. The software for the delete subroutine is illustrated in FIG. 9. If the delete key is pressed for three seconds, steps 260 and 262, the delete mode is set active, step 264, and the displayed record in either the log or the directory, depending on whether the log search flag is set, is deleted, steps 266, 268, 270. The software then proceeds to the next step in the search routine, FIG. 7, which displays the next entry. If the delete key is pressed again, this entry is also deleted. If five seconds elapses since any key was pressed, step 272, then the delete mode is reset, step 274, and the program returns to the next step in the search routine.

An add or a modify record routine is another functional routine that can be called upon in the main mode, step 126, of the executive routine. This routine permits a new directory entry to be entered or an existing entry to be edited. A new directory entry may be added by pressing the clear key to clear LCD 23 and then entering new data using keypads 36 and 38. After entering data add key 35 is pressed. Alternately, data may be entered by pressing any alpha-numeric keys when the default time and date are displayed followed by pressing add key 35.

During the add operation, only alpha characters are permitted on name line 32. At least one alpha character must be entered on the first line and at least one numeric character must be entered on the second line before the new directory entry can be added to memory. LCD 23 is cleared when data has been properly entered into the directory. An error message and beep occurs if data is not entered properly.

Any phone number already in the log can be automatically transferred from the log to the directory. For example, a log entry can be retrieved and displayed on LCD 23 using the search routine described above. The displayed date and time of the call can be overwritten with a name using alpha keys and then added to directory 16 by pressing add key 35. A neW name can also be added by first pressing the clear key and then entering the new name, before pressing add key 35. The user may accomplish this function at any time.

Figure 10:
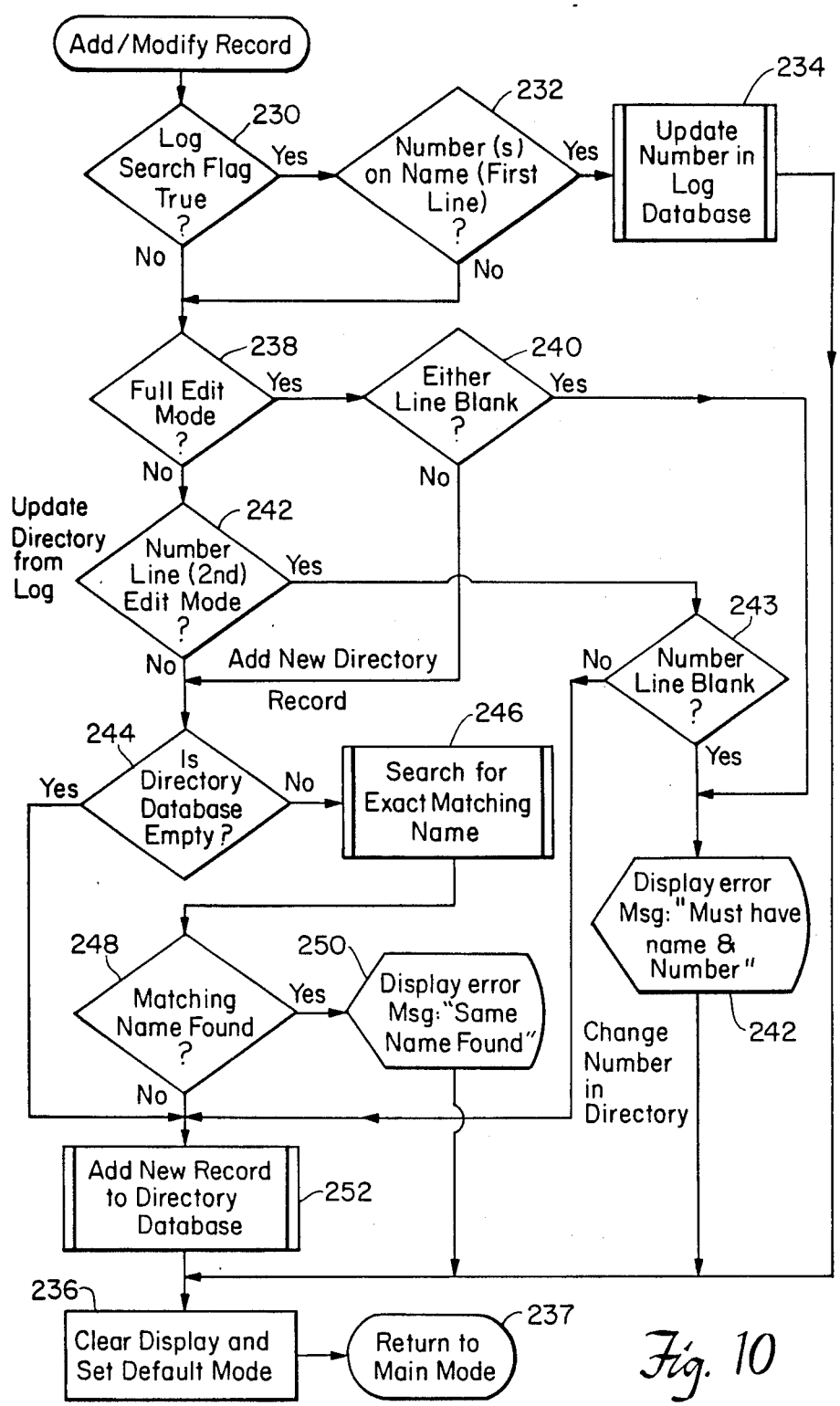
FIG. 10 is a flow chart of the add/modify record routine shown in FIG. 5.

An add/modify record flow chart is illustrated in FIG. 10 and is described below. Upon initiating an add or a modify command, the system determines whether a log search flag has been set, step 230. If the log search flag is set and numbers are displayed on name line 32, then the number in the log data base is updated, steps 232 and 234, and the display is cleared. The default mode is also set, step 236, before the software returns to the main mode of the executive routine, step 237.

If the log search flag is not set, then the software determines whether a full edit mode is desired by the user, step 238. The full edit mode allows the name line 32 and the number line 34 to be edited. If either line is left blank, then an error message is displayed on LCD 23, steps 240 and 242. LCD 23 is then cleared, and the default mode is set before returning to the main mode in the executive routine, steps 236 and 237.

Once the user properly enters at least one alpha character in name line 32 and at least one number in number line 34 of LCD 23, a search is conducted in the directory for matching that exact name entry, steps 244, 246 and 248. If a match is found, an error message is displayed indicating that the same entry was found, step 250, thereby disallowing duplicate names. The add-/modify record software then returns to the main mode of the executive routine. If no match was found then the new entry is added into the directory data base, step 252, and the program returns to the main mode, step 126, of the executive routine.

The user may change the number of the party stored in the directory by using the numeric keys to overwrite the displayed number followed by pressing the add key, steps 242, 243, and 252.

Figure 11:
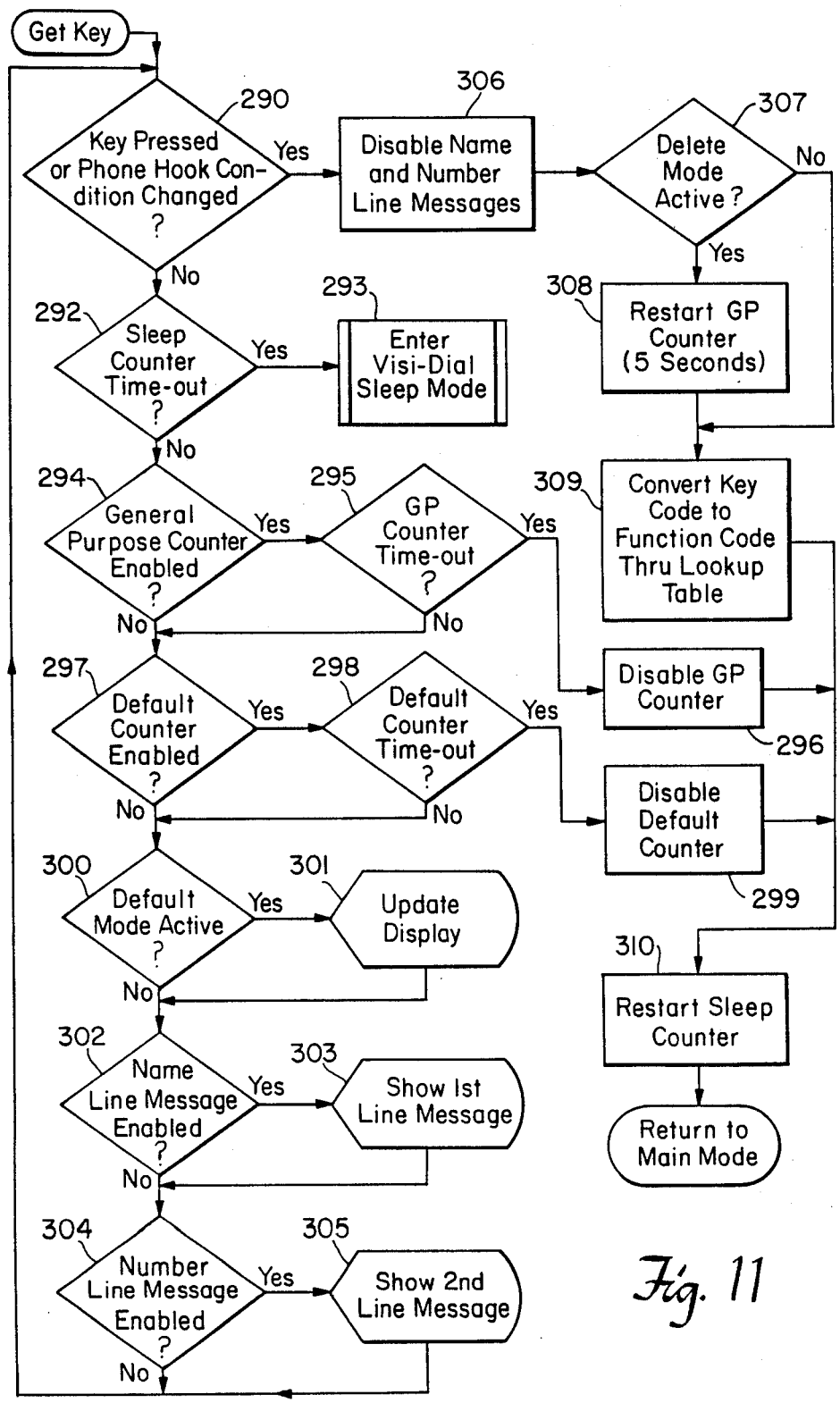
FIG. 11 is a flow chart of a general maintenance routine that is performed by the system of FIG. 1 between successive depressions of keys on the control console shown in FIG. 2.

Between successive keys being pressed, a decision loop is traveled as shown in the flow chart illustrated in FIG. 11. In this loop, software counters for sleep and default modes and general purpose counters are decremented and tested for time-out conditions, steps 290-301. Display flags are also checked for proper co-ordination of display information, steps 302-305. Once a key is pressed, or the telephone line condition changes, this decision loop is exited. Display messages are then disabled and the delete mode is tested, steps 306 and 307. If the delete mode is active then the five-second counter is reset, step 308. The key press is then converted to a function code by a look-up table stored in PROM 54, step 309, and the sleep mode timer is reset, step 310. After the timer for the sleep mode has been reset, the software returns to the main mode, step 126, of the executive routine.

Figure 12:
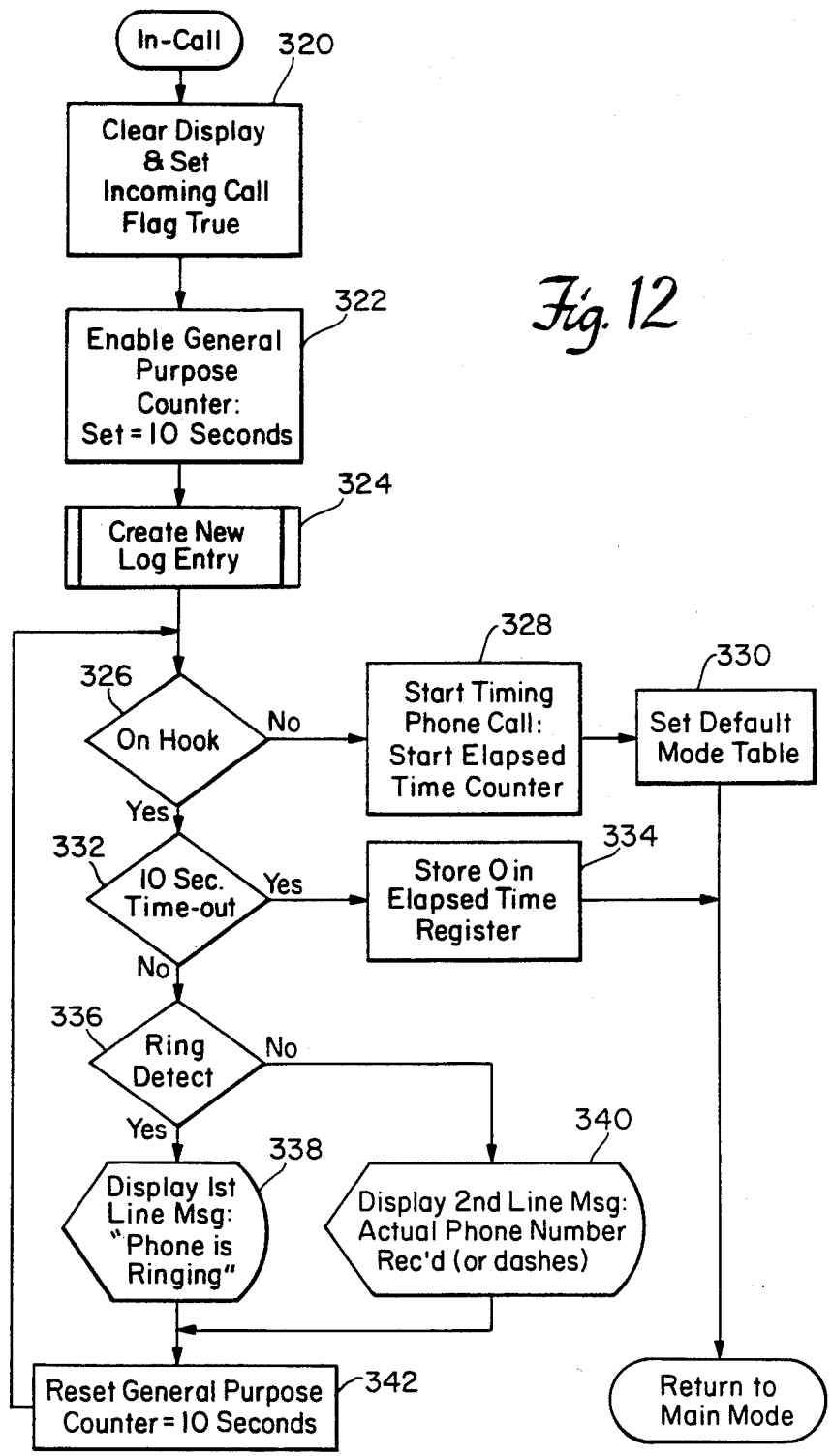
FIG. 12 is a flow chart of an in-call routine used in the system of FIG. 1.

The function of timing of an incoming call begins when a call is received and an off-hook is detected and ends when the phone is hung up. If the phone was not picked up and more than ten seconds have elapsed since the last ring signal, a zero minute call duration is recorded in logging module 22 with the incoming phone number. The flow chart for this function is illustrated in FIG. 12.

Initially, when an incoming call is detected, LCD 23 is cleared and an incoming call flag is set, step 320. A ten-second general purpose counter is then enabled, step 322, and a new log entry is created, step 324. The date of the call, the telephone number of the calling party, and a flag indicating that the call is an incoming call (i) are stored in the log. If a matching name exists in the directory, then the name and the number are displayed on LCD 23 between phone rings, step 340.

The status of the ON/OFF hook switch is sensed for determining if the user answered the incoming calls, step 326. If the user answers the incoming call then an elapsed timer is set for timing the duration of the call, step 328. The default mode is also set, step 330, and the software returns to the main mode of the executive routine. If a search function was activated before the incoming call, then the software returns to the last position of the search.

In the event that the call is not answered by the user, the software tests the ten second counter to see if ten seconds have elapsed since the last ring signal, steps 326 and 332. During a ring signal, LCD 23 displays a message that the phone is ringing, steps 336 and 338, and the ten second counter is reset, step 342. Ten seconds after the last ring the duration for that incoming call is recorded as zero, step 334.

Another function that is performed during the main mode of the executive routine is the automatic dial function. Any phone number listed in the log or directory can be automatically dialed by pressing the dial key when it is visible on LCD 23. Numbers for multiple searches may also be dialed sequentially. This allows the user to call a long-distance telephone number by finding and dialing the stored area code or access number and then finding and dialing the requested destination telephone number. In the preferred embodiment, up to five sequential number strings may be dialed per call. Partial numbers may also be dialed by writing over unwanted digits with a spacer key before pressing the dial key.

Figure 13:
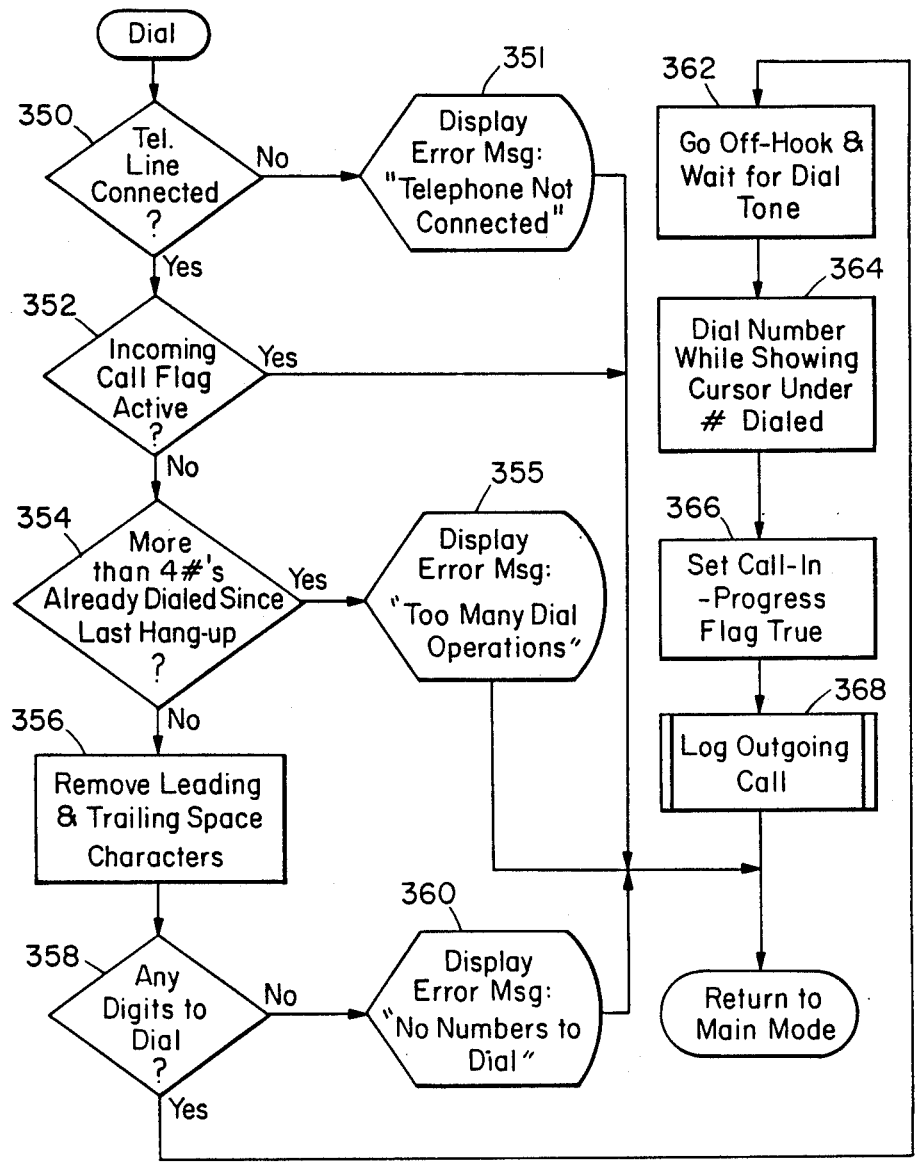
FIG. 13 is a flow chart of an automatic dial routine used in the system of FIG. 1.

The flow chart for performing the automatic dialing function is illustrated in FIG. 13. This routine prevents dialing if telephone interface circuit 72 detects that system 10 is not connected to the telephone line, steps 350 and 351, if the present call is incoming, step 352, or if there are no digits on the number line, steps 356, 358 and 360. Dialing is also prevented if the user tries to dial more than five number strings, steps 354 and 355. Digits to be dialed are dialed when system 10 goes off hook and a dial tone is received, steps 362 and 364. Timing of an outgoing call begins a fixed time interval after dialing and stops when telephone interface circuit 72 detects that the phone is on hook, step 366. Timing of the length of a call is not disturbed when a search or other function is conducted during the call. The call is then logged as an outgoing call, step 368. The phone number, time and date of the call are also logged. Dialing may also be accomplished by manual entering numbers using numeric keypad 38.

Although specific features of the invention are shown in some drawings and not others, this is for convenience only as each feature may be combined with any or all of the other features in accordance with the invention.

Other embodiments will occur to those skilled in the art and are within the following claims. For example, logging module 22 may be used for storing both the incoming or outgoing call number and the party identified in directory 16 having a matching telephone number as well as date and time of that call. Entries in directory 16 can also be stored alphabetically. Further, the user has the ability to access either logging module 22 or directory 16 without system 10 being connected to telephone line 14.

What is claimed is:

1. An automatic incoming telephone call number display device comprising:
   a directory of telephone numbers and parties associated with those numbers;
   means for detecting the origin telephone number of an incoming telephone call;
   means for comparing the detected incoming telephone number with said directory of telephone numbers to identify the party associated with the incoming call number;
   display means for displaying the incoming call number or the incoming call number and the identified associated party before the incoming call is answered;
   means for logging the detected incoming telephone number;
   means for retrieving telephone numbers of incoming calls logged by said means for logging; and
   means for automatically entering telephone numbers retrieved by said means for retrieving into said directory.

2. The automatic incoming telephone call number display system of claim 1 further including means for storing the detected number of the incoming telephone call.

3. The automatic incoming telephone call number display system of claim 2 further including means for recording the date and time of the incoming call.

4. The automatic incoming telephone call number display system of claim 1 further including means for providing to said means for displaying the date, time, and duration of the incoming call.

5. The automatic incoming telephone call number display system of claim 2 further including means for switching the system to an off-hook condition when a number is dialed and means for timing the duration of the outgoing call.

6. The automatic incoming telephone call number display system of claim 5 further including means for storing the date, time and duration of the outgoing call.

7. The automatic incoming telephone call number display system of claim 5 further including means for providing to said means for displaying the date, time, and duration of the outgoing call.

8. The automatic incoming telephone call number display system of claim 1 further including means for searching the directory.

9. The automatic incoming telephone call number display system of claim 8 in which said means for searching includes means for searching the directory includes means for searching for a preselected party.

10. The automatic incoming telephone call number display system of claim 8 in which said means for searching the directory includes means for searching for a preselected number.

11. The automatic incoming telephone call number display system of claim 1 further including means for adding a party and an associated number to said directory.

12. The automatic incoming telephone call number display system of claim 1 further including means for deleting a party and an associated number from said directory.

13. The automatic incoming telephone call number display system of claim 1 further including means for editing said directory.

14. The automatic incoming telephone call number display system of claim 1 further including means for automatically dialing a number in said directory.

15. The automatic incoming telephone call number display system of claim 1 further including means for displaying the current time and date on said display means when said system is not being used during detection of incoming or placing outgoing calls.

16. An automatic incoming telephone call number display system comprising:
   a directory of telephone numbers and parties associated with those numbers;
   means for detecting the origin telephone number of an incoming telephone call;
   means for comparing the detected incoming telephone number with said directory of telephone numbers to identify the party associated with the incoming call number;

display means for displaying the incoming call number and the identified associated party before the incoming call is answered;

means for logging all incoming calls chronologically;

means for retrieving telephone numbers of incoming calls logged by said means for logging; and means for automatically entering into said directory telephone numbers retrieved by said means for retrieving.

17. The automatic incoming telephone call number display system of claim 16 further including means for recording the date and time of the incoming call.

18. The device of claim 16 further including means for dialing outgoing calls.

19. An automatic incoming telephone call number display system comprising:

a directory of telephone numbers and parties associated with those numbers;

means for detecting the origin telephone number of an incoming telephone call;

means for comparing the detected incoming telephone number with said directory of telephone numbers to identify the party associated with the incoming call number;

display means for displaying the incoming call number and the identified associated party before the incoming call is answered;

means for logging outgoing calls chronologically;

means for retrieving telephone numbers of outgoing calls logged by said means for logging; and means for automatically entering into said directory telephone numbers retrieved by said means for retrieving.

20. The device of claim 19 further including means for storing the date and time of the incoming call.

21. The device of claim 18 further including means for storing the date, the time, and the duration of the outgoing calls.

22. The automatic incoming telephone call number display system of claim 19 further including means for storing the duration of the incoming call.

23. The automatic incoming telephone call number display system of claim 22 further including means for sensing when a telephone has gone off-hook in response to an incoming call, and means for timing the duration of the incoming call.

24. The automatic incoming telephone call number display system of claim 19 further including means for logging all incoming calls chronologically.

25. The automatic incoming telephone call number display system of claim 24 further including means for retrieving telephone numbers of incoming calls logged by said means for logging.

26. The automatic incoming telephone call number display system of claim 25 further including means for automatically dialing the telephone number retrieved by said means for retrieving.

27. The automatic incoming telephone call number display system of claim 16 further including means for logging the outgoing calls chronologically.

28. The automatic incoming telephone call number display system of claim 27 further including means for retrieving telephone numbers of outgoing calls logged by said means for logging.

29. The automatic incoming telephone call number display system of claim 28 further including means for automatically dialing the telephone number retrieved by said means for retrieving.

30. The automatic incoming telephone call number display system of claim 19 further including means for preventing a user from dialing a telephone number if an incoming telephone call is detected by said means for detecting.

31. The automatic incoming telephone call number display system of claim 1 further including telephone handset means for communicating over a telephone line.

32. The automatic incoming telephone call number display system of claim 16 further including means for manually dialing a telephone number.

* * * * *